(12) United States Patent
Ligrani

(10) Patent No.: US 12,272,228 B2
(45) Date of Patent: Apr. 8, 2025

(54) IDENTIFYING EMERGENCY RESPONSE VALIDITY AND SEVERITY

(71) Applicant: Intrado Life & Safety, Inc., Longmont, CO (US)

(72) Inventor: Nora Ligrani, Denver, CO (US)

(73) Assignee: Intrado Life & Safety, Inc., Longmont, CO (US)

( * ) Notice: Subject to any disclaimer, the term of this patent is extended or adjusted under 35 U.S.C. 154(b) by 0 days.

(21) Appl. No.: 17/183,317

(22) Filed: Feb. 23, 2021

(65) Prior Publication Data

US 2021/0267010 A1    Aug. 26, 2021

Related U.S. Application Data

(60) Provisional application No. 62/980,996, filed on Feb. 24, 2020.

(51) Int. Cl.

| | |
|---|---|
| G08B 25/00 | (2006.01) |
| G06Q 50/00 | (2012.01) |
| G08B 25/10 | (2006.01) |
| H04W 4/02 | (2018.01) |
| H04W 4/029 | (2018.01) |
| H04W 4/38 | (2018.01) |
| H04W 4/90 | (2018.01) |
| H04W 76/50 | (2018.01) |

(52) U.S. Cl.
CPC ........... *G08B 25/007* (2013.01); *G06Q 50/01* (2013.01); *G08B 25/10* (2013.01); *H04W 4/023* (2013.01); *H04W 4/025* (2013.01); *H04W 4/029* (2018.02); *H04W 4/38* (2018.02); *H04W 4/90* (2018.02); *H04W 76/50* (2018.02)

(58) Field of Classification Search
None
See application file for complete search history.

(56) References Cited

U.S. PATENT DOCUMENTS

| | | | |
|---|---|---|---|
| 8,175,225 B2 | 5/2012 | Buscemi et al. | |
| 8,447,014 B2 | 5/2013 | Nelson | |
| 9,380,144 B1 * | 6/2016 | Kritt | H04W 4/021 |
| 9,457,754 B1 * | 10/2016 | Christensen | G08G 1/205 |
| 9,602,152 B2 * | 3/2017 | Wohl | H04W 4/029 |
| 9,619,996 B1 * | 4/2017 | Smith | G08B 27/001 |
| 9,767,677 B1 | 9/2017 | Paulin | |
| 9,852,599 B1 | 12/2017 | Slavin et al. | |
| 10,142,687 B2 * | 11/2018 | Gurha | H04N 21/44204 |

(Continued)

OTHER PUBLICATIONS

USPTO Non-Final Office Action mailed in U.S. Appl. No. 18/226,614 on Mar. 26, 2024, 17 pages.

(Continued)

*Primary Examiner* — Ankur Jain
(74) *Attorney, Agent, or Firm* — Patent Capital Group

(57) ABSTRACT

One example method of operation may include identifying a plurality of emergency reporting entities located at an emergency location based on one or more received emergency communications, determining whether one or more of the emergency reporting entities have provided valid emergency response data, determining a level of severity of the emergency response data, and transmitting one or more notifications to one or more emergency response entities based on the level of severity and a type of emergency.

20 Claims, 21 Drawing Sheets

(56) References Cited

U.S. PATENT DOCUMENTS

| | | | |
|---|---|---|---|
| 10,212,231 B2* | 2/2019 | Cooper | H04L 67/52 |
| 10,750,346 B1* | 8/2020 | Di Domenico | G06F 3/0481 |
| 10,824,741 B1 | 11/2020 | Porter | |
| 11,315,408 B1 | 4/2022 | Nelson et al. | |
| 2011/0071880 A1* | 3/2011 | Spector | H04W 76/50 |
| | | | 340/539.13 |
| 2011/0142207 A1 | 6/2011 | Goldman et al. | |
| 2013/0046847 A1* | 2/2013 | Zavesky | G06Q 10/00 |
| | | | 709/217 |
| 2013/0214925 A1 | 8/2013 | Weiss | |
| 2013/0285820 A1* | 10/2013 | Assuncao | G01W 1/10 |
| | | | 702/3 |
| 2014/0115671 A1 | 4/2014 | Abhyanker | |
| 2014/0364081 A1* | 12/2014 | Rauner | H04L 12/1895 |
| | | | 455/404.2 |
| 2014/0368601 A1 | 12/2014 | deCharms | |
| 2015/0288797 A1* | 10/2015 | Vincent | G16H 10/60 |
| | | | 455/404.2 |
| 2015/0379355 A1* | 12/2015 | Kanga | H04N 7/181 |
| | | | 382/103 |
| 2016/0094964 A1* | 3/2016 | Barfield, Jr. | H04W 4/90 |
| | | | 340/870.07 |
| 2016/0119424 A1 | 4/2016 | Kane et al. | |
| 2016/0140299 A1* | 5/2016 | Al Harbi | G16Z 99/00 |
| | | | 705/2 |
| 2016/0217669 A1* | 7/2016 | Benoit | G08B 21/02 |
| 2016/0227384 A1* | 8/2016 | Mazzarella | H04W 4/10 |
| 2016/0232774 A1* | 8/2016 | Noland | G08B 25/10 |
| 2016/0266733 A1* | 9/2016 | Alon | G06F 3/0484 |
| 2016/0277892 A1* | 9/2016 | Walker | G08B 25/08 |
| 2016/0371968 A1 | 12/2016 | Almansour | |
| 2017/0055126 A1* | 2/2017 | O'Keeffe | H04W 4/21 |
| 2017/0086192 A1* | 3/2017 | Bohlander | H04W 4/90 |
| 2017/0243485 A1* | 8/2017 | Rubin | H04W 4/46 |
| 2017/0245237 A1* | 8/2017 | Thompson | H04W 4/80 |
| 2017/0294131 A1* | 10/2017 | Jedrzejewski | H04W 76/45 |
| 2017/0295252 A1* | 10/2017 | Mottur | H04W 4/023 |
| 2017/0372593 A1 | 12/2017 | Chadwick et al. | |
| 2018/0060767 A1* | 3/2018 | Dillard | G06Q 50/12 |
| 2018/0095607 A1 | 4/2018 | Proctor | |
| 2018/0144587 A1 | 5/2018 | Stogel | |
| 2018/0184051 A1* | 6/2018 | Watanabe | B64C 39/024 |
| 2018/0225939 A1* | 8/2018 | Subramanian | G06N 5/022 |
| 2018/0247135 A1* | 8/2018 | Oami | G06T 7/248 |
| 2018/0253814 A1 | 9/2018 | Kaguma et al. | |
| 2018/0272992 A1 | 9/2018 | Gage et al. | |
| 2019/0038362 A1* | 2/2019 | Nash | A61B 34/25 |
| 2019/0047578 A1 | 2/2019 | Swan et al. | |
| 2019/0215339 A1* | 7/2019 | Chen | H04L 63/1425 |
| 2019/0311534 A1 | 10/2019 | Shore | |
| 2019/0355237 A1 | 11/2019 | Singh | |
| 2020/0034454 A1* | 1/2020 | Chamarajnager | H04W 4/38 |
| 2020/0110935 A1* | 4/2020 | Paul | G08B 19/00 |
| 2020/0178198 A1 | 6/2020 | Ding et al. | |
| 2020/0236525 A1 | 7/2020 | Paulin | |
| 2020/0274962 A1* | 8/2020 | Martin | H04W 4/02 |
| 2020/0284938 A1* | 9/2020 | Chaturvedi | G01V 15/00 |
| 2020/0314240 A1 | 10/2020 | Leavitt et al. | |
| 2020/0314623 A1* | 10/2020 | Pellegrini | H04W 4/021 |
| 2020/0334470 A1* | 10/2020 | Abeykoon | G06V 10/96 |
| 2020/0357268 A1 | 11/2020 | Tyson | |
| 2020/0396292 A1* | 12/2020 | Ono | H04W 4/90 |
| 2021/0006933 A1 | 1/2021 | Dean | |
| 2021/0084436 A1 | 3/2021 | Sutherland | |
| 2022/0141616 A1 | 5/2022 | Myshenin et al. | |

OTHER PUBLICATIONS

Non-Final Office Action mailed in U.S. Appl. No. 18/382,864 dated Jun. 14, 2024, 22 pages.

USPTO Notice of Allowance mailed in U.S. Appl. No. 18/226,614 on Jul. 12, 2024, 12 pages.

USPTO Non-Final Office Action mailed in U.S. Appl. No. 18/226,148 on Jul. 18, 2024, 20 pages.

USPTO Non-Final Office Action mailed in U.S. Appl. No. 18/226,148 on Dec. 4, 2024, 10 pages.

USPTO Notice of Allowance mailed in U.S. Appl. No. 17/183,322 on Jun. 30, 2023, 11 pages.

* cited by examiner

414

428

436

442

450

468

470

472

474
476

480

482

484

IDENTIFYING EMERGENCY RESPONSE VALIDITY AND SEVERITY

CROSS-REFERENCE TO RELATED APPLICATIONS

This application claims priority to U.S. provisional application No. 62/980,996 entitled "SAFETY SHIELD" filed on Feb. 24, 2020, the entire contents of which are hereby incorporated by reference.

TECHNICAL FIELD

This application relates to providing emergency service, and more specifically to an integrated emergency response and data network.

BACKGROUND

Conventionally, emergency services are limited to a call center which receives a 9-1-1 call and dispatches emergency services appropriate for the emergency. More advanced systems employ sensors and are setup to be monitored and to alert emergency services automatically when a potential emergency arises and the system performs its own response to the potential emergency via one or more sensors.

Recent emergency types of events demonstrate that more lives can be saved if the emergency response team has access to all the potentially necessary information needed to engage the emergency upon arrival at an emergency event location. Also, confirmation of the types of emergencies from entities located near or at the emergency site can provide additional information necessary to properly engage the emergency by emergency response services.

SUMMARY

Example embodiments of the present application provide at least a method that includes one or more of identifying an emergency location based on a received emergency communication, determining enhanced information is available in a memory for the emergency location, retrieving the enhanced information, and forwarding the enhanced information to one or more emergency service entities and one or more registered devices located at the emergency location.

Another example embodiment may include an apparatus that includes a processor configured to identify an emergency location based on a received emergency communication, determine enhanced information is available in a memory for the emergency location, retrieve the enhanced information, and forward the enhanced information to one or more emergency service entities and one or more registered devices located at the emergency location.

Still another example embodiment may include a non-transitory computer readable storage medium configured to store instructions that when executed cause a processor to perform one or more of identifying an emergency location based on a received emergency communication, determining enhanced information is available in a memory for the emergency location, retrieving the enhanced information, and forwarding the enhanced information to one or more emergency service entities and one or more registered devices located at the emergency location.

Another example embodiment may include a method that includes one or more of identifying a plurality of emergency reporting entities located at an emergency location based on one or more received emergency communications, determining whether one or more of the emergency reporting entities have provided valid emergency response data, determining a level of severity of the emergency response data, and transmitting one or more notifications to one or more emergency response entities based on the level of severity and a type of emergency.

Still another example embodiment may include an apparatus that includes a processor configured to identify a plurality of emergency reporting entities located at an emergency location based on one or more received emergency communications, determine whether one or more of the emergency reporting entities have provided valid emergency response data, determine a level of severity of the emergency response data, and transmit one or more notifications to one or more emergency response entities based on the level of severity and a type of emergency.

Still yet another example embodiment may include a non-transitory computer readable storage medium configured to store instructions that when executed cause a processor to perform identifying a plurality of emergency reporting entities located at an emergency location based on one or more received emergency communications, determining whether one or more of the emergency reporting entities have provided valid emergency response data, determining a level of severity of the emergency response data, and transmitting one or more notifications to one or more emergency response entities based on the level of severity and a type of emergency.

Another example embodiment may include a method that includes one or more of receiving potential emergency event communications from one or more of a plurality of emergency monitoring entities targeting a potential emergency location, comparing the potential emergency event communications to one or more emergency event thresholds, determining a level of severity of the potential emergency event, and transmitting one or more notifications to one or more emergency response entities based on the one or more emergency events thresholds being exceeded and the level of severity.

Still yet a further example embodiment includes an apparatus that includes a processor configured to receive potential emergency event communications from one or more of a plurality of emergency monitoring entities targeting a potential emergency location, compare the potential emergency event communications to one or more emergency event thresholds, determine a level of severity of the potential emergency event, and transmit one or more notifications to one or more emergency response entities based on the one or more emergency events thresholds being exceeded and the level of severity.

Still another example embodiment may include a non-transitory computer readable storage medium configured to store instructions that when executed cause a processor to perform receiving potential emergency event communications from one or more of a plurality of emergency monitoring entities targeting a potential emergency location, comparing the potential emergency event communications to one or more emergency event thresholds, determining a level of severity of the potential emergency event, and transmitting one or more notifications to one or more emergency response entities based on the one or more emergency events thresholds being exceeded and the level of severity.

DETAILED DESCRIPTION

Figure 1:
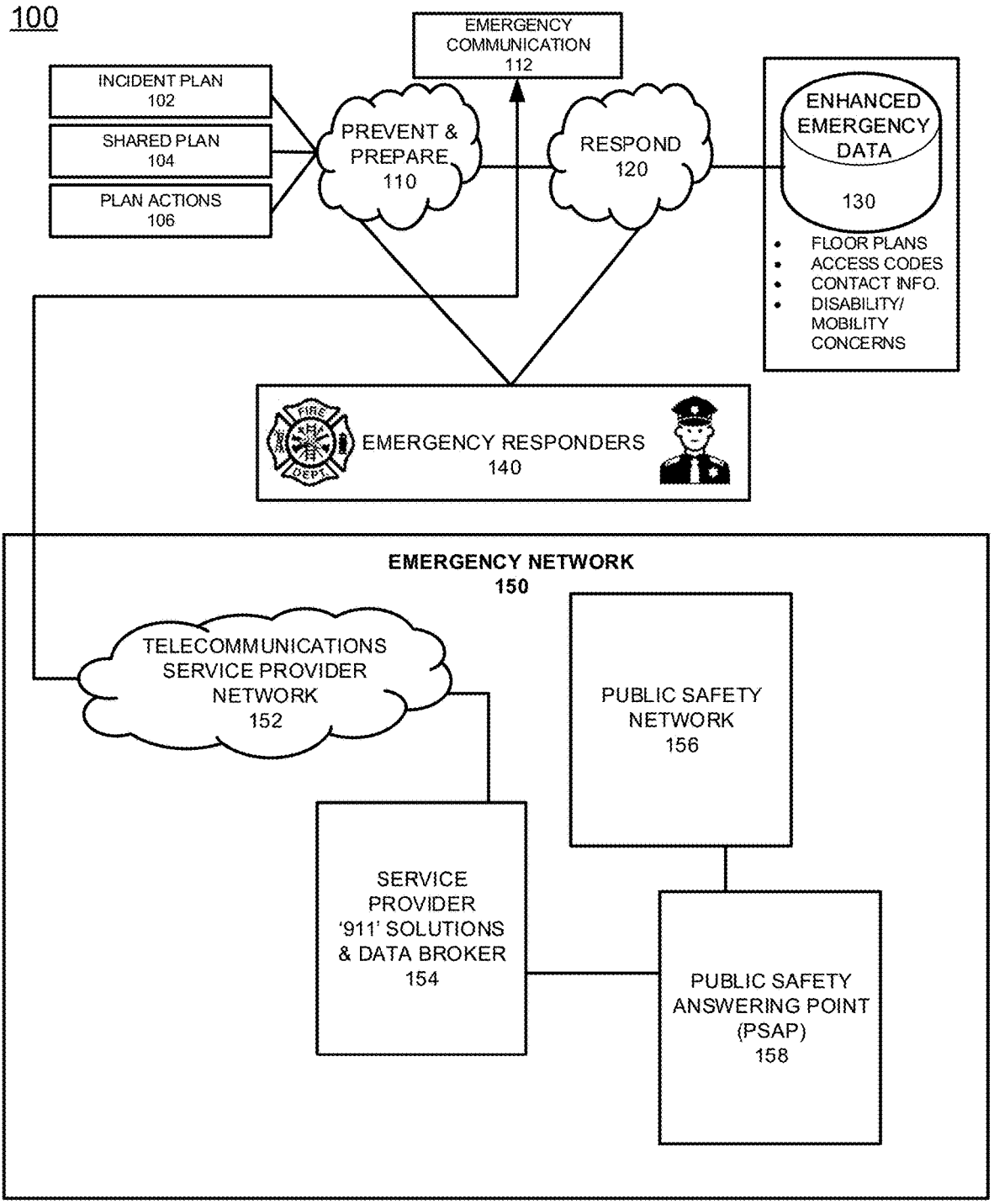
FIG. 1 illustrates an example emergency response network according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to provide operations to enable an end-to-end public safety service to various community entities. Although schools are the focus of the discussion, the example embodiments may be applied to any densely populated social environment or other public location where enhanced emergency service data can be obtained, shared and used to provide optimal emergency response services.

Emergency calling, such as 911 call service centers and related emergency response environments may be integrated into a user application for various registered users both actively participating in the emergency monitoring efforts or those which are passively included as targets for potential safety response efforts. The system may offer a disaster prevention feature with anonymous reporting of potentially dangerous conditions and related information, a preparation feature which integrates response measures to include access to known location data, registered administrator data, actions, responsibilities, etc., all of which are retrieved and distributed at the appropriate times. Other features include a response feature which may include automated monitoring of various sensors and devices, automated lockdown and assignment of responsibilities, third party notifications to those which are not located at the site of interest, etc. Another feature may include a reunification and recovery feature which directs those third parties to certain information sources and instructs them to perform various actions to further the process of recovery and finalization to the emergency event.

The emergency response services, such as the fire department, the police department, the rescue department, the hazard materials and conditions department, etc., all require and benefit from access to detailed information regarding the status and type of emergency. Also, sharing information from one entity to the next is a simple but effective strategy to increasing the chances of success. The entities (e.g., mobile devices operated by staff, administration computers and related devices, sensors, cameras and other feedback providing entities) at the emergency site are also likely to respond with greater accuracy and faster response times when provided with instructions, details of the pending event and accountability. Moreover, the third parties will also play a key role in their ability to not storm the emergency site and to provide additional services, if necessary, when notified of the event emergency location and details regarding the event.

FIG. 1 illustrates an example emergency response network according to example embodiments. Referring to FIG. 1, the network 100 includes one or more emergency creation entities which contribute to the process of identifying the emergency, identifying a response strategy plan, such as by sharing enhanced data, and determining which actions to take and when to perform such actions. The incident plan 102, the shared plan data 104 and the actions 106 are all part of the known information or the computed output of one or more input parameters received by the emergency management system. A network of call initiators and/or receivers may offer a prevention and preparation backbone 110 to the other parties included in the emergency response. As the emergency communication is received 112, the prevention and preparation entities 110 may offer call, message, data, etc., services necessary to ensure the response team 120 can react and engage the emergency location of 'interest' properly and without any unnecessary delays. The network of resource data may be stored in an accessible database 130. Examples of enhanced emergency data may include floor plans of buildings where the emergency is occurring, access codes to unlock and lock doors and other passages, contact information, live feeds of videos and other sensory equipment, special requirement information, and other information as well.

The network 100 of data resources can be shared with the emergency responders 140 via a privileged communication conducted on a permissioned application platform. Device applications can be used to share live voice, video, audio, images, textual information on smartphones or other computing platforms. The network for managing the emergency communication may be an emergency network 150 that includes various communication entities all of which can be managed by a centralized server on a cloud platform. The telecommunications service provider 152 may route the call or communication to the responders 124. The service provider may offer a 911 management solution that accesses certain data as a data broker 154 and share the information with the calling entity and the public safety answering point (PSAP) 158. The public safety network 156 may be its own data network of resources which can also be shared with the responders.

Figure 2:
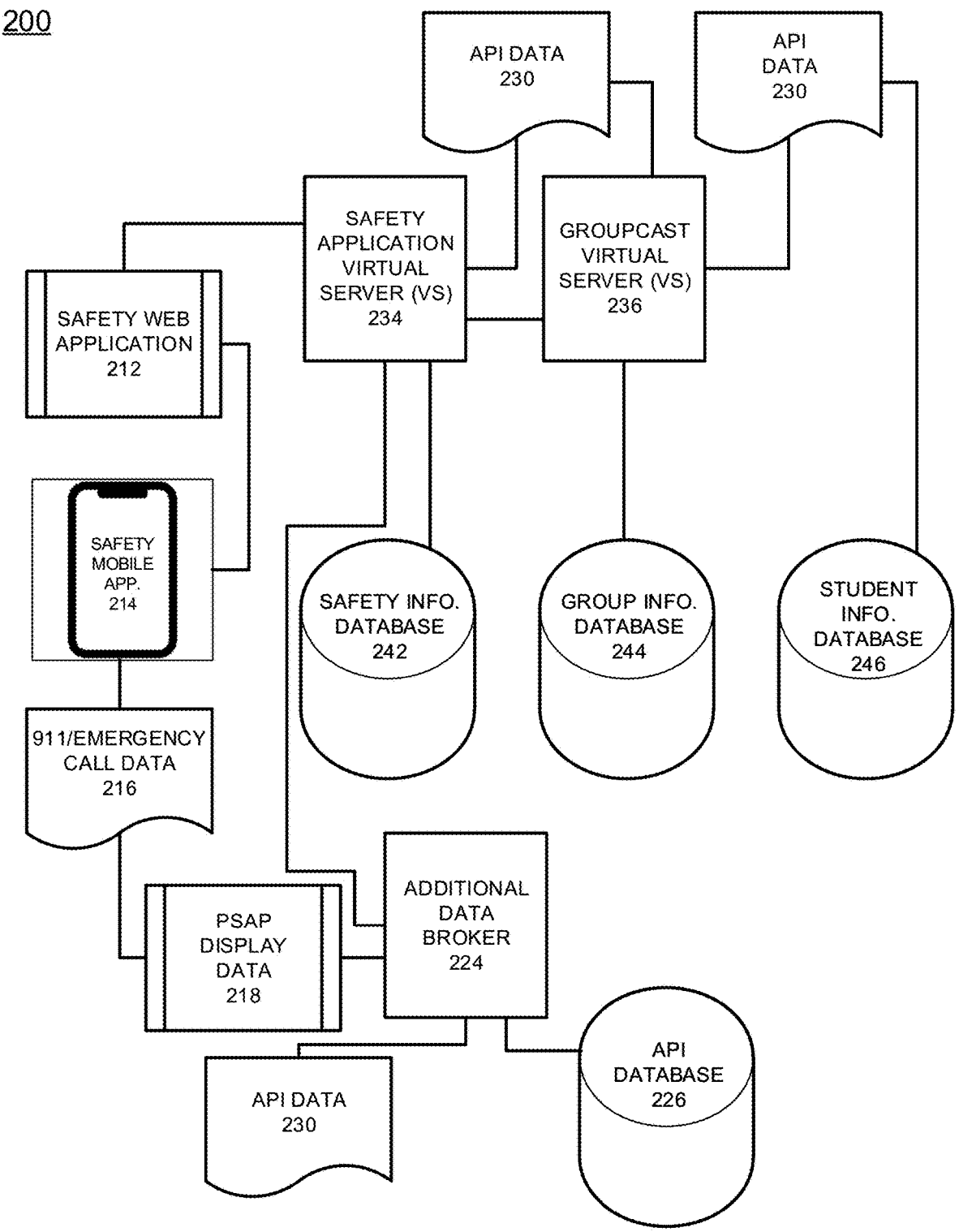
FIG. 2 illustrates an example data communication system for the emergency response network according to example embodiments.

FIG. 2 illustrates an example data communication system for the emergency response network according to example embodiments. Referring to FIG. 2, the system 200 includes a network of data elements and applications which will be used when performing enhanced emergency service type actions. Referring to FIG. 2, the mobile device 214 may be operating a safety application that has a push button emergency feature. The safety web application 212 may receive the notification and access one or more virtual servers and/or emergency platforms. The call data 216 may include a notification with images, text, audio, etc., depending on the nature of the emergency. The safety application 234 and the groupcast feature 236 may reference certain API data 230 to enable a data retrieval and sharing operation.

In one example, the mobile device 214 may have a safety application that is activated by a user or automatically depending on the nature of the emergency. The initial report for an emergency may send a notification to a data sharing platform that includes information entered by the application device, such as user input, automated detection information, etc. The device 214 may receive a wireless transmission signal from a nearby sensor that a loud sound like a known gunshot or similar event as detected and the application will be sending a communication to an emergency platform in 10 seconds unless a cancel operation is received by a user. The action that is sent may invoke monitoring platforms that then capture audio, video, images, etc., the instant the emergency is identified and shared with the emergency service system. The floor plans and other data may be retrieved to share the location or sub-location (e.g., third floor junior student sub-school locker area) via the safety application 234 from the various databases 242. The entities to share the information with are also identified from the groupcast server 236 and the accompanying database 244. The student information may also be retrieved 246 to determine the locations of the students by their respective devices which are known and tracked by the database 246. The tracking may be performed by network signaling and triangulation of signal strengths and/or GPS signals shared with the platform and the mobile devices of the students. Also, the PSAP display data 218 may be engaged to share the data with emergency responders. This data may include private location data and related emergency response data with access codes, locations, secret entrances, etc.

Figure 3:
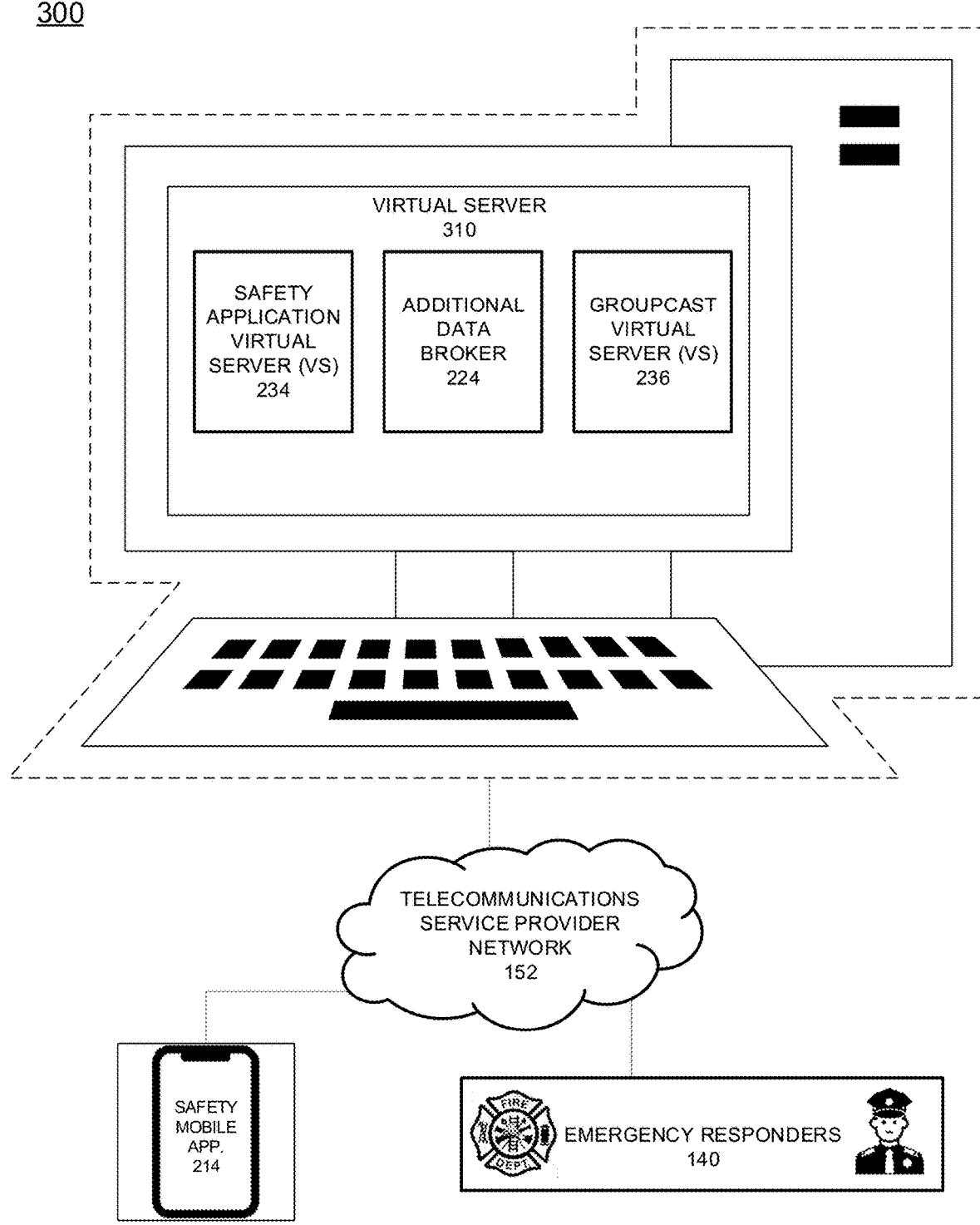
FIG. 3 illustrates a consolidated virtual machine configured to provide a cloud-based computing platform for the various computing entities according to example embodiments.

FIG. 3 illustrates a consolidated virtual machine configured to provide a cloud-based computing platform for the various computing entities according to example embodiments. Referring to FIG. 3, the virtual server 310 represents an integrated cloud computing platform that provides data integration for all the necessary emergency service and management server applications. All the individual applications and servers may be virtually joined as a single server via cloud computing service. The server may then be a single network location where all the applications can share data, manage emergency calls and messaging, and retrieve, share and update emergency data with other sources.

Figure 4A:
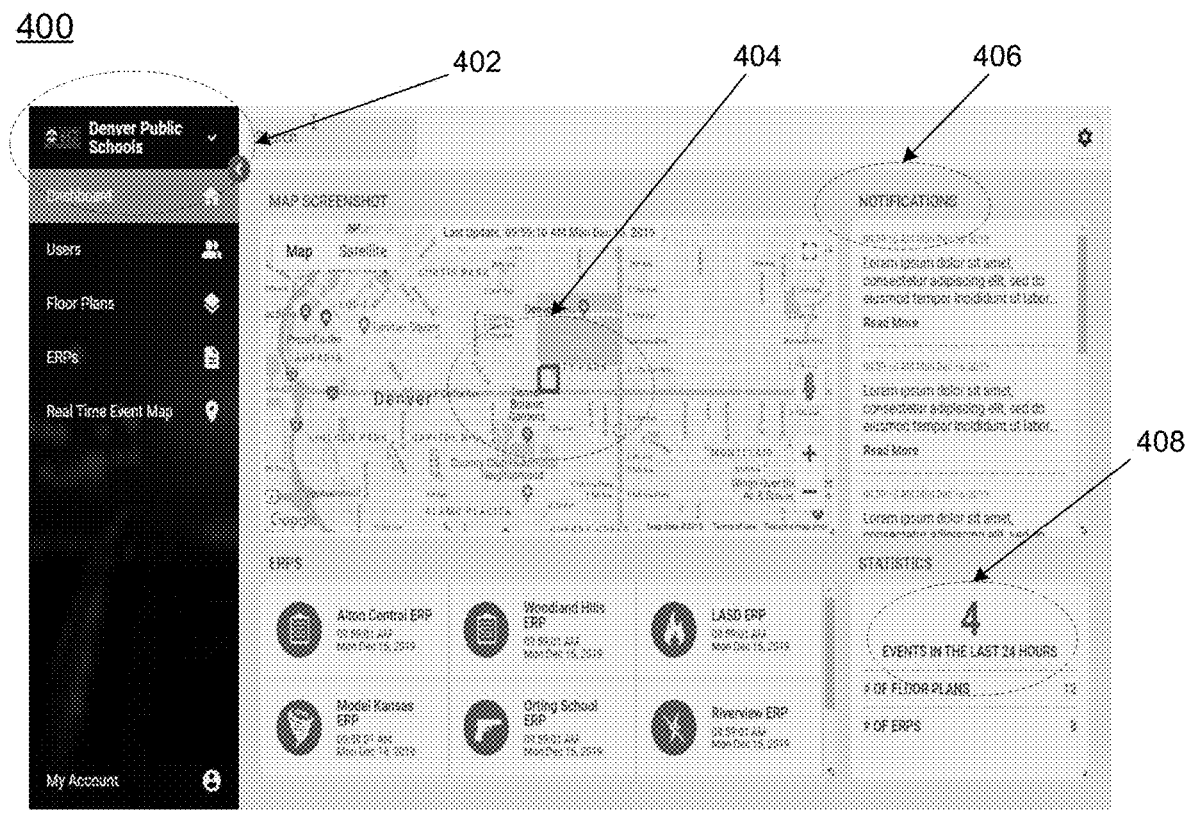
FIG. 4A illustrates an example graphical user interface of an emergency response application according to example embodiments.

FIG. 4A illustrates an example graphical user interface of an emergency response application according to example embodiments. Referring to FIG. 4A, the example 400 includes a dashboard view of a particular emergency location (i.e., school 402), with a display of multiple data elements. The main view portion may include a map or geographical display 404 of the location with respect to other locations and/or a close-up view of the location and the sub-locations, such as floors, halls, entrances, etc., which may be the focus of the emergency event. The display may also include a list of recent emergency events, the types of events, the dates, and other information including recent activity 408. As notifications 406 are received pertaining to the location, those notifications may be listed and updated as they arrive from monitored sources or other third party data sources. All information received about an area of interest can be displayed in a single summarized view display format or as part of a customized display option.

Figure 4B:
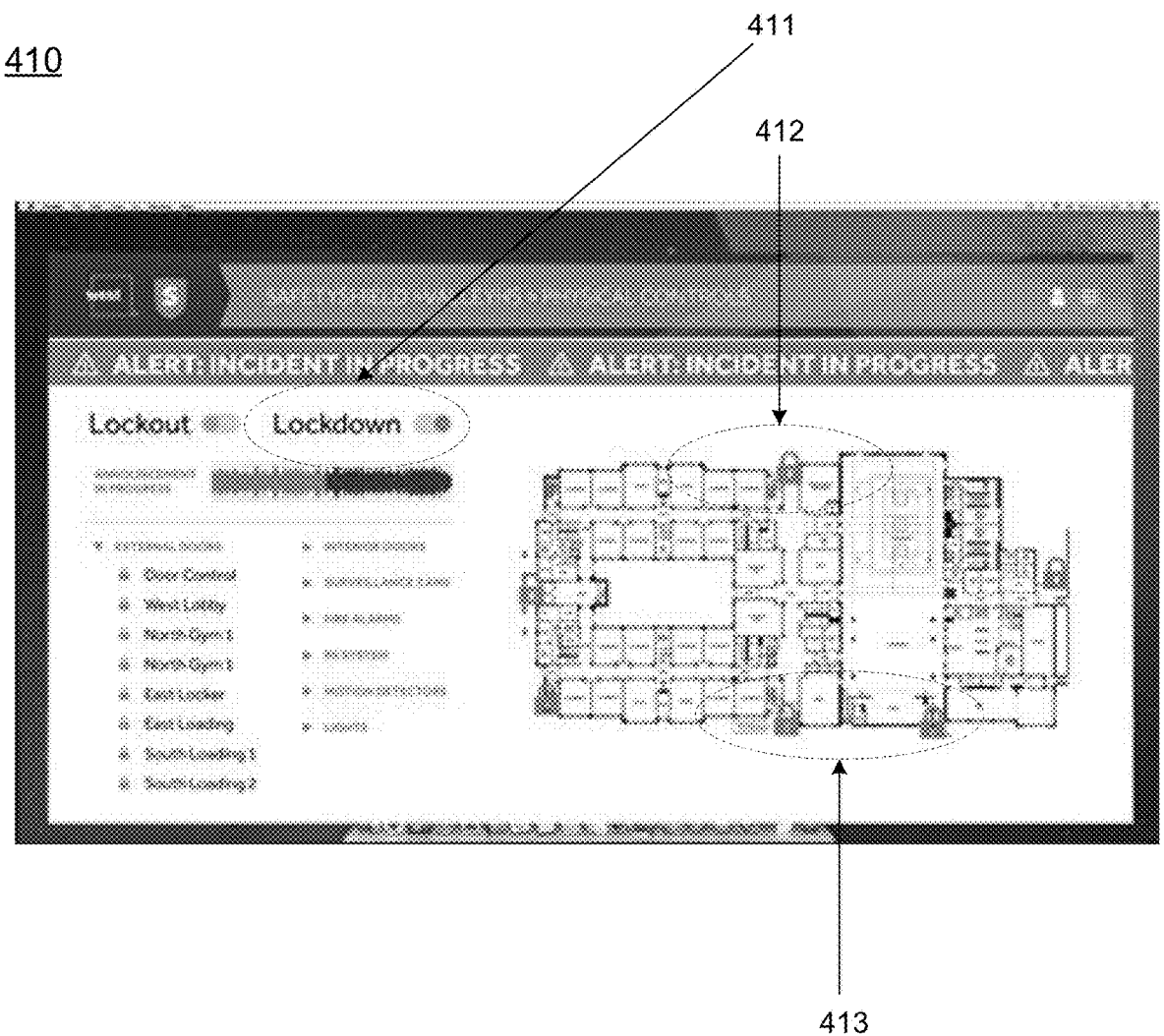
FIG. 4B illustrates another example graphical user interface of an emergency response application according to example embodiments.

FIG. 4B illustrates another example graphical user interface of an emergency response application according to example embodiments. Referring to FIG. 4B, the example interface 410 demonstrates a floorplan of a particular location of interest, such as a school building. The doorways in this example are illustrated as having been set to lockdown 411. The option to lock or unlock doors may be managed remotely by the emergency responder team. Also, the display map may update as doors or passageways are locked or unlocked automatically or by those at the location and with the proper authority to provide such services. The map may also show the other sensory devices which can capture sound and imagery.

Figure 4C:
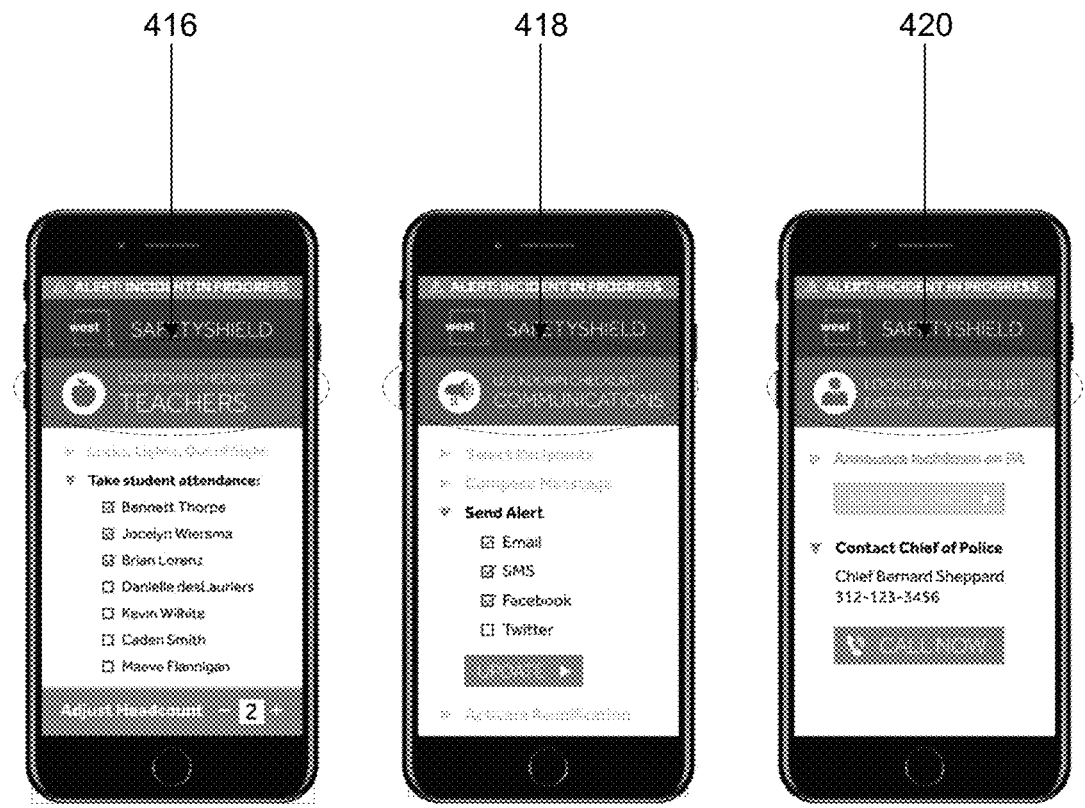
FIG. 4C illustrates still another example graphical user interface of an emergency response application according to example embodiments.

FIG. 4C illustrates still another example graphical user interface of an emergency response application according to example embodiments. Referring to FIG. 4C, the example interface displays 414 includes a responsibility checklist for a teacher 416. The teacher may be known to have a list of students in his or her classroom at a particular time. When the list is finished being filled-out or not filled out completely, then the teacher may submit the list. Any vacancies are identified and sent to a master notification list of potential discrepancies. The list may automatically populate by those students which have their phones on and which can be identified by a wireless communication medium either via an access point nearby in the school or in a cellular network management area or via direct communication to the administrator/teacher device. The additional lists of information needed may include a lockdown checklist 418 of items to perform prior to the lockdown being enabled/disabled. Other lists 420 may include a notification medium and/or a contact number for one or the response entities.

Figure 4D:
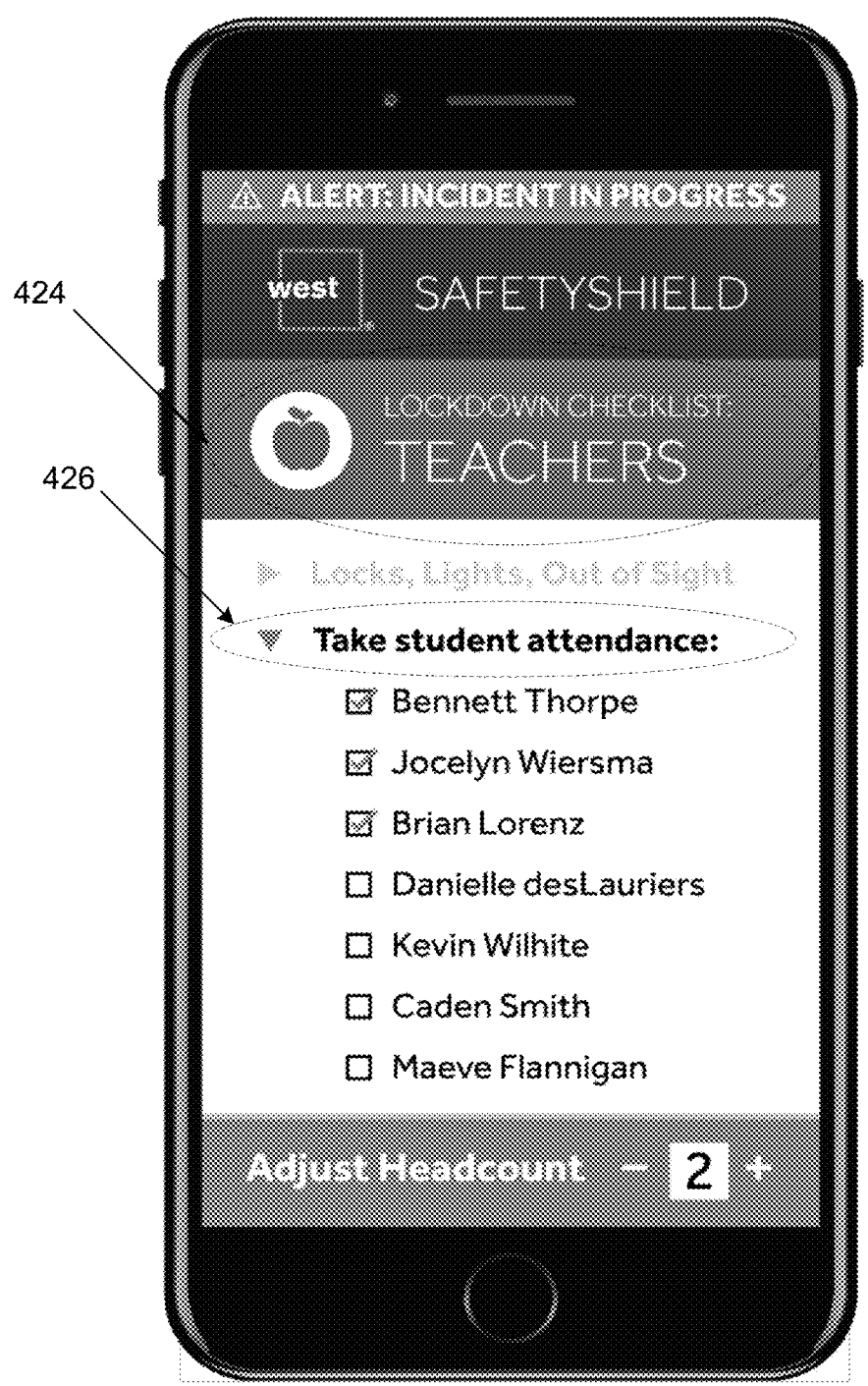
FIG. 4D illustrates yet another example graphical user interface of an emergency response application according to example embodiments.

FIG. 4D illustrates yet another example graphical user interface of an emergency response application according to example embodiments. Referring to FIG. 4D, the example interface 422 may include a specific display offered to a particular administrator at the emergency site location during an emergency event. The example display is for one or more teachers 424 and may include various lists to view and instructions to comply with along with responsibilities which may vary depending on a teacher location. The responsibilities may include identifying a list of students 426 provided to the teacher device application and submitting the list as they are identified or not identified by the teacher and the device application interface. The other responsibilities may include locking the door to the room or establishing a communication with one or more emergency service representatives. The various controls may be submitted automatically by the teacher device (i.e., smartphone) as the sensory data may be determined automatically and sent automatically.

Figure 4E:
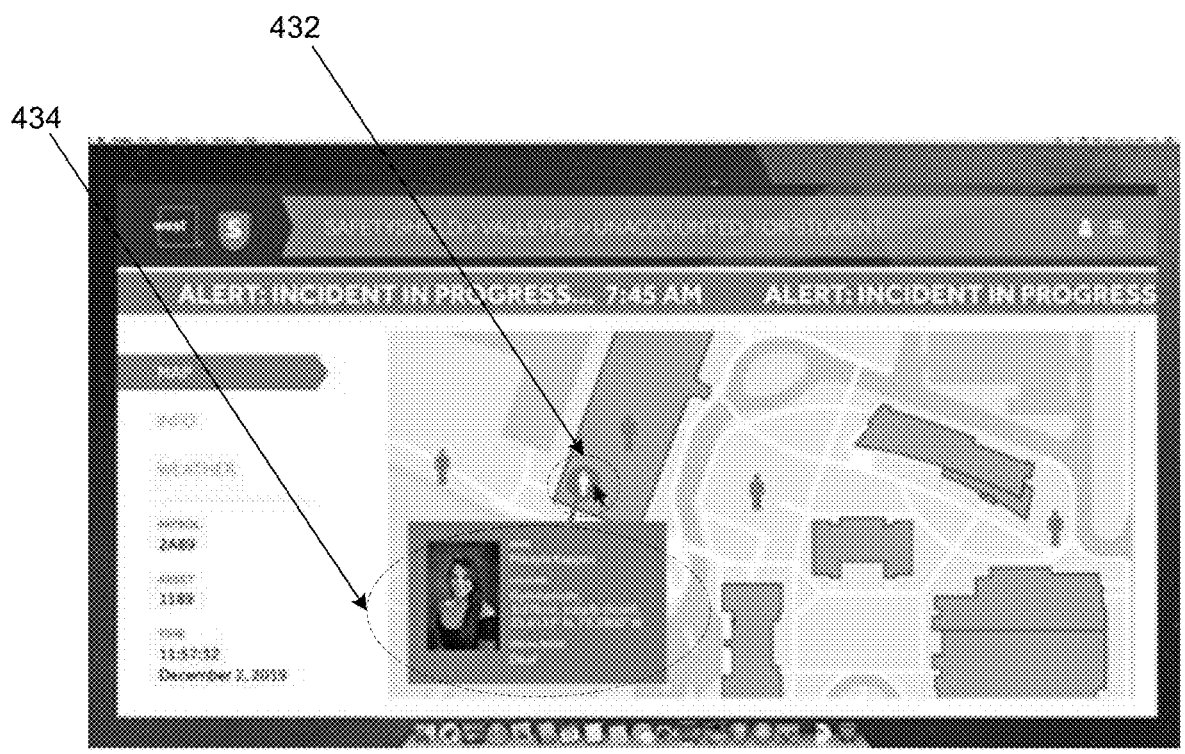
FIG. 4E illustrates still yet another example graphical user interface of an emergency response application according to example embodiments.

FIG. 4E illustrates still yet another example graphical user interface of an emergency response application according to example embodiments. Referring to FIG. 4E, the example interface 428 includes an example where a student is identified 434 by a phone or similar mobile device carried by the user being located at an area of interest 432. Once the area of interest is identified, basic fundamental operations may occur, such as monitoring all the sensors/cameras operating in and around that particular area. Also, the user's mobile device which identified the user as being at the particular location may begin performing certain actions, such as monitoring the environment for sounds and forwarding the sounds to an audio processing platform to screen for potential threats or conditions which could cause a threat to human life.

Figure 4F:
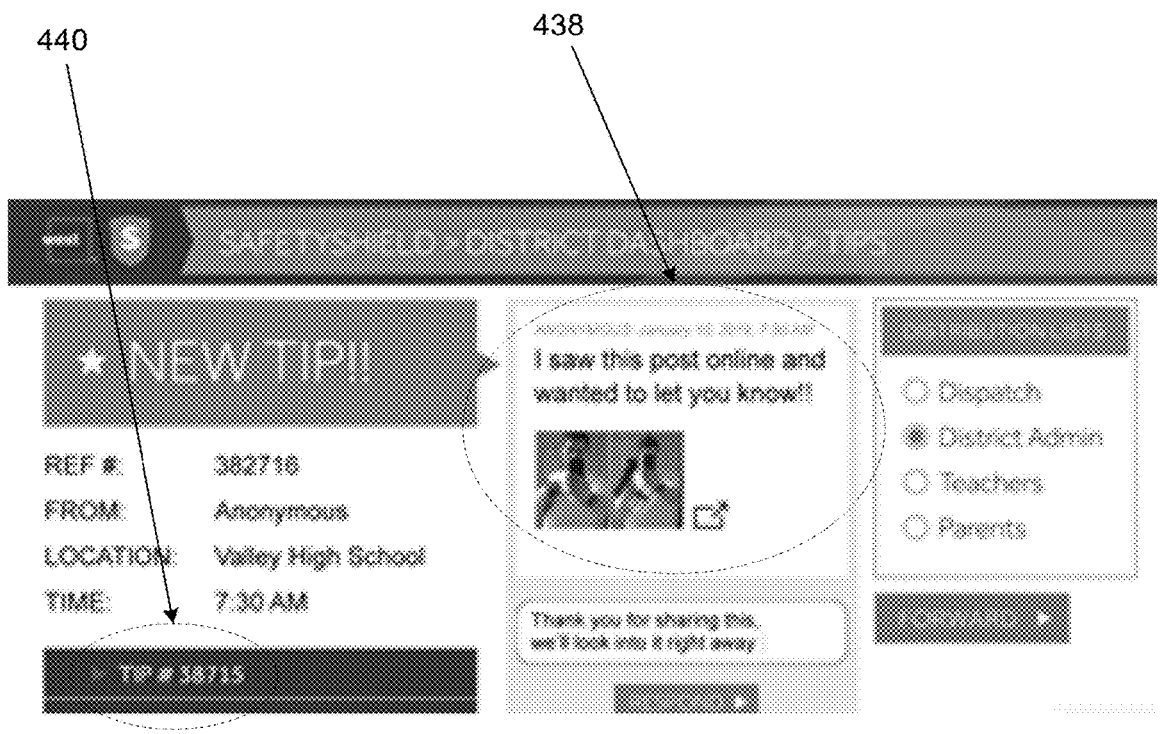
FIG. 4F illustrates still another example graphical user interface of an emergency response application according to example embodiments.

FIG. 4F illustrates still another example graphical user interface of an emergency response application according to example embodiments. Referring to FIG. 4F, the example interface 436 includes a display of a user application interface having shared a particular social media post of a person actin suspiciously by holding a weapon and posting derogatory or threating comments. The tips from users may arrive and be indexed by an assigned index number. The information from a tip can be cross-referenced with other information sources, such as social media sites or other sites which can be used to compare notifications and feeds for similar information and to establish whether a credible threat is present. For example, the threat and emergency thresholds may require a certain type of threat, certain words or a certain number of posts to be considered credible by a weighted function that continually evaluates the information received and determines whether the threat triggers an evaluation threshold.

Figure 4G:
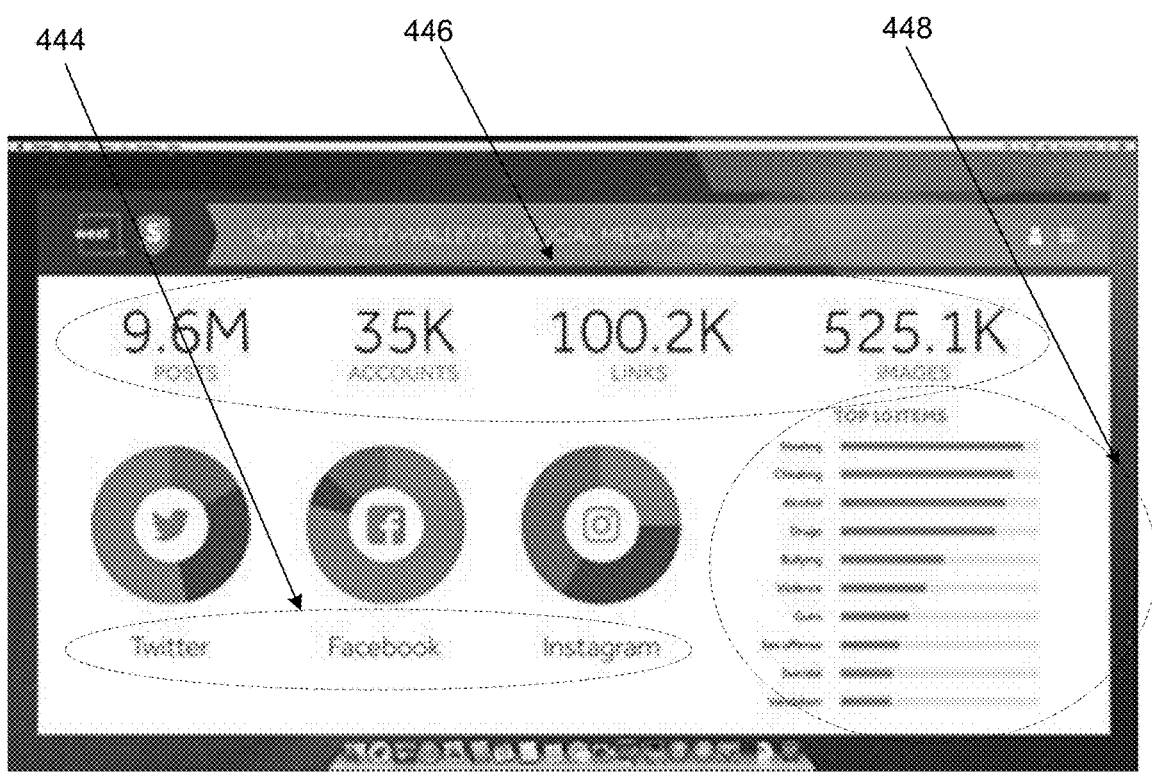
FIG. 4G illustrates a further example graphical user interface of an emergency response application according to example embodiments.

FIG. 4G illustrates a further example graphical user interface of an emergency response application according to example embodiments. Referring to FIG. 4G, the example display interface 442 includes a social media monitoring summary 446 of popular social network platforms 444 and various sites which are being monitored for information pertaining to a particular location. The summary of topics and related information may be filtered and displayed for easy reference purposes 448. The concerns may be easy to monitor especially when a credible threat is identified since the posts may increase around an alarming post, such as a bomb threat or other major emergency concern. Also, the immediate identification of a threat can assist with lead time for authorities to track the source of the post which can provide an opportunity to alleviate the situation and resume school regular attendance hours.

Figure 4H:
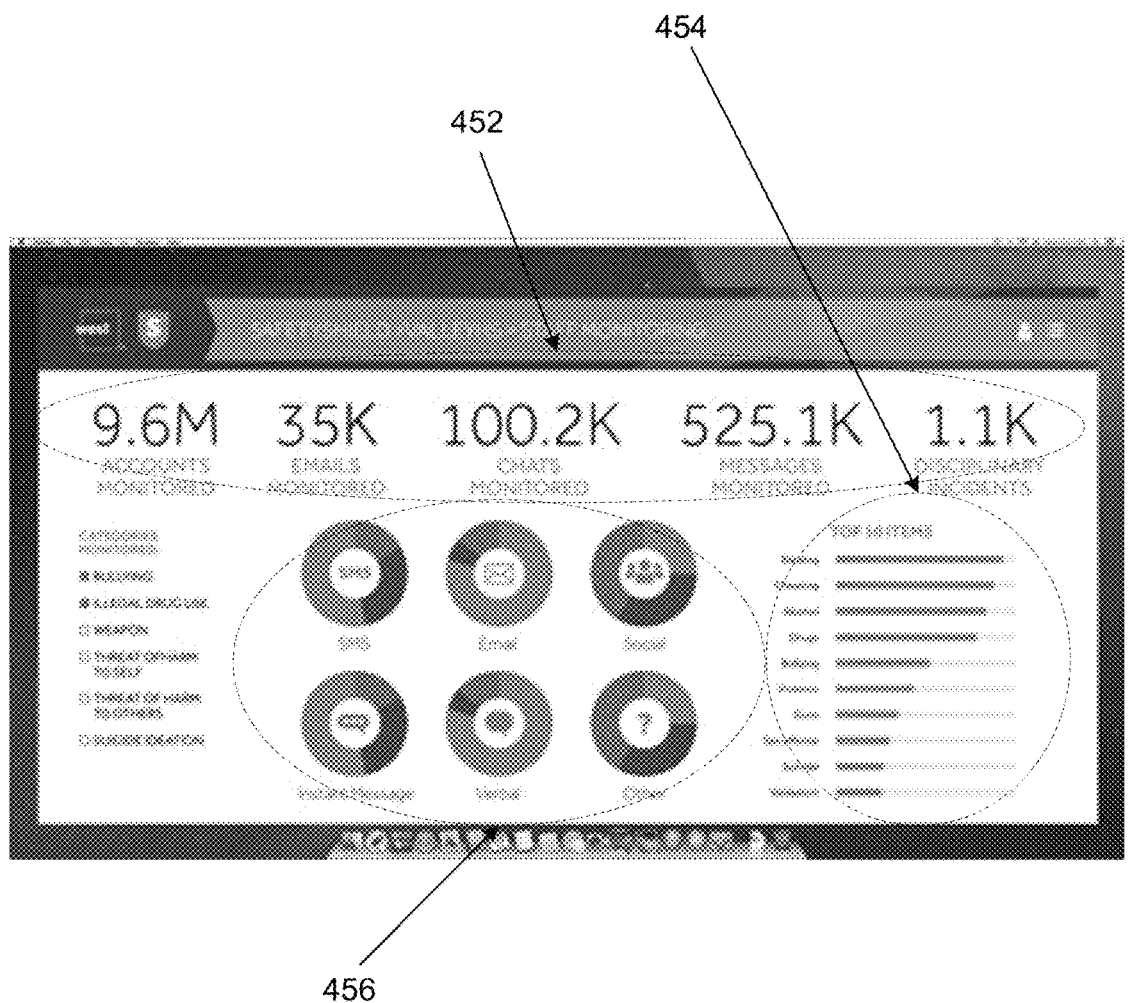
FIG. 4H illustrates and another example graphical user interface of an emergency response application according to example embodiments.

FIG. 4H illustrates and another example graphical user interface of an emergency response application according to example embodiments. Referring to FIG. 4H, similar to the example in FIG. 4G, the social network monitoring summary 450 may also be performed for staff members of the school including a summary of account information 452, a list of popular subject areas or terms and phrases 454 and a number of mediums 456 including SMS messages, email and other communications which were recorded and identified as being related to the school environment.

Figure 4I:
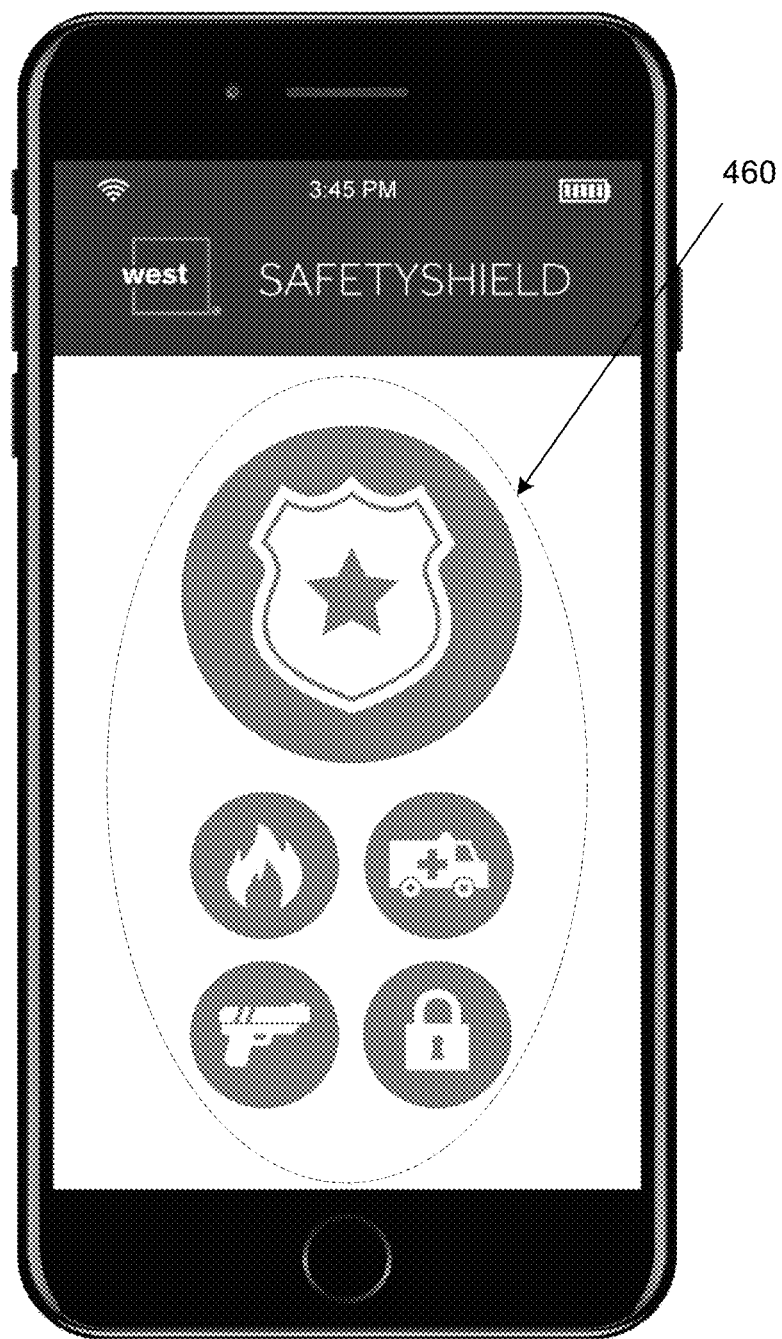
FIG. 4I illustrates still a further example graphical user interface of an emergency response application according to example embodiments.

FIG. 4I illustrates still a further example graphical user interface of an emergency response application according to example embodiments. Referring to FIG. 4I, the application device interface 458 includes an example of safety and emergency services being accessible by the touch of a button 460. The type of emergency may be selectable from the button options on the display interface. The user may select an option to trigger an emergency response from one or more emergency service providers.

Figure 4J:
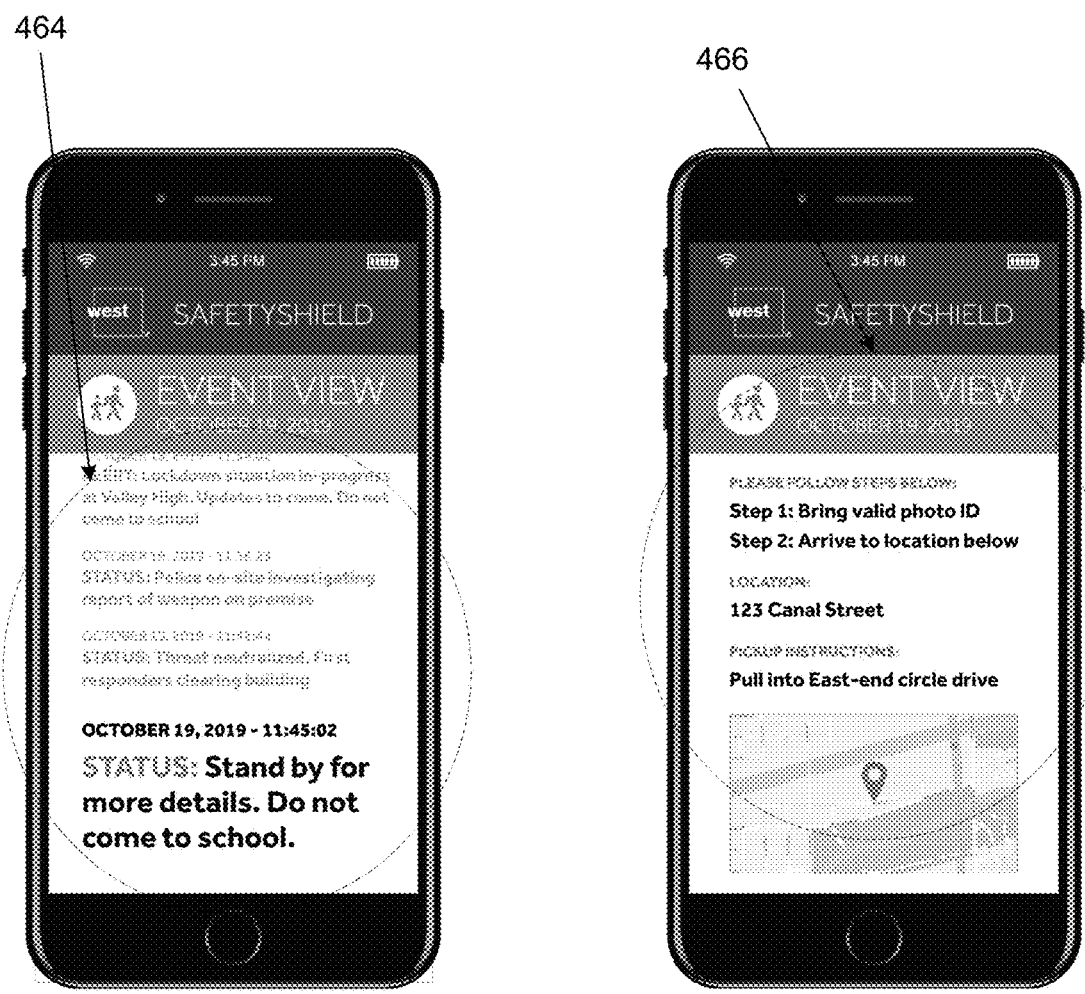
FIG. 4J illustrates still yet another example graphical user interface of an emergency response application according to example embodiments.

FIG. 4J illustrates still yet another example graphical user interface of an emergency response application according to example embodiments. Referring to FIG. 4J, the user interface display examples 462 include a third party alert status. In the first display 464, the current status is provided to the third party (i.e., parents/family) of a current emergency location area. The status may include instructions to not attempt to visit the emergency location until an update has been broadcast to those registered third parties. In another example, the instructions 466 on how to proceed when arriving at the emergency location are provided to the registered user.

Figure 4K:
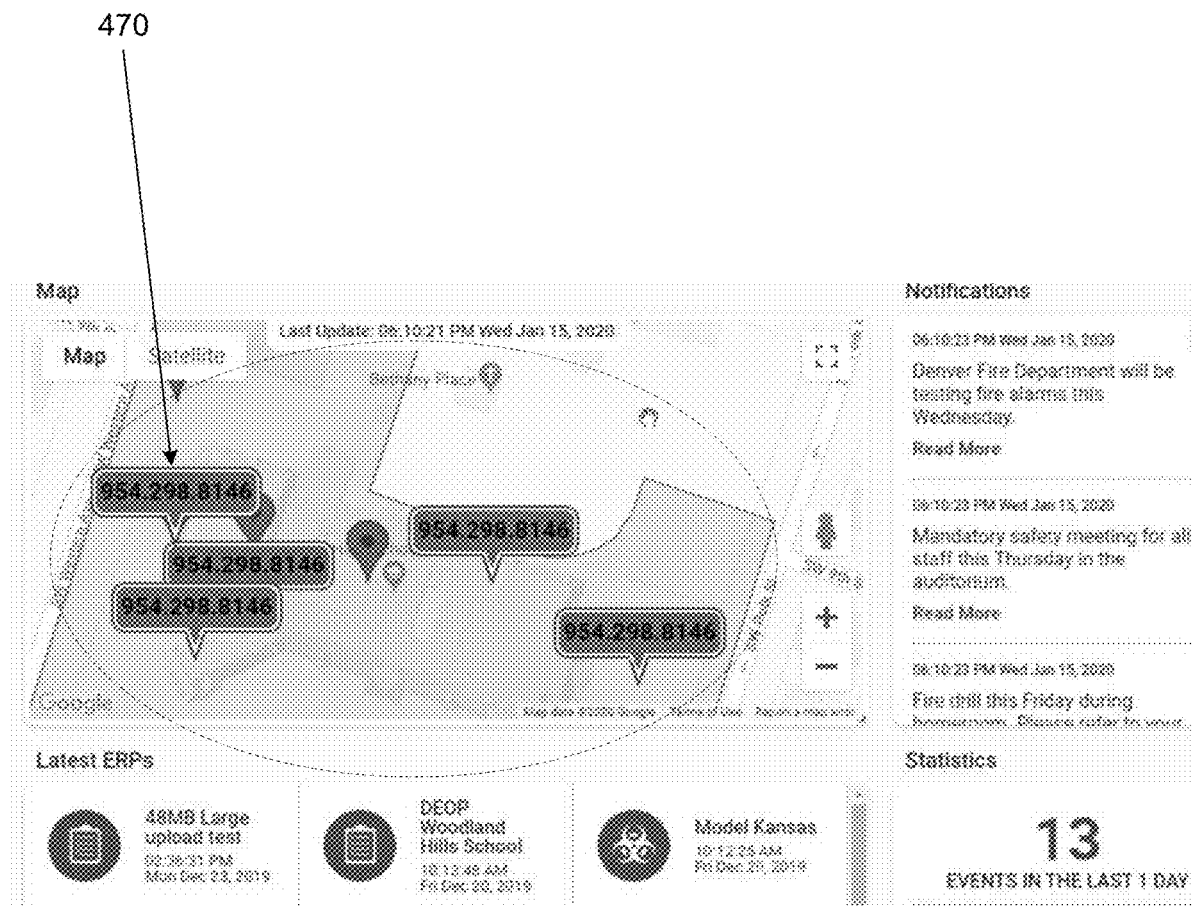
FIG. 4K illustrates still a further example graphical user interface of an emergency response application according to example embodiments.

FIG. 4K illustrates still a further example graphical user interface of an emergency response application according to example embodiments. Referring to FIG. 4K, the example 468 demonstrates a heat map or density map of known mobile device telephone numbers in a concentrated area. For example, the emergency situation may be monitored based on an initial trigger such as an area of interest identified from certain sensory data or social media information. Then, the area becomes suspect for certain events, such as a protest, fight, etc. The number of expected mobile devices in any area may have a threshold amount especially at a particular time of day. In this example, the density map 470 may be above or below an expected threshold number of devices in the area. After a period of time, if the mobile device density in a particular area is above the threshold (e.g., 50 devices identified), then the potential for an emergency may be higher. Also, the movement of devices may also dictate an emergency if the number of devices moving around has exceeded a threshold number of devices moving in a period of time for a particular amount of area.

Figure 4L:
FIG. 4L illustrates still a further example graphical user interface of an emergency response application according to example embodiments.

FIG. 4L illustrates still a further example graphical user interface of an emergency response application according to example embodiments. Referring to FIG. 4L, the example display 472 demonstrates an example of a sub-location 474 within a particular area 476, such as a school area. The area of interest may be highlighted to demonstrate the details of the emergency area for a concerned party that is attempting to identify the details of the area where the emergency is occurring.

Figure 4M:
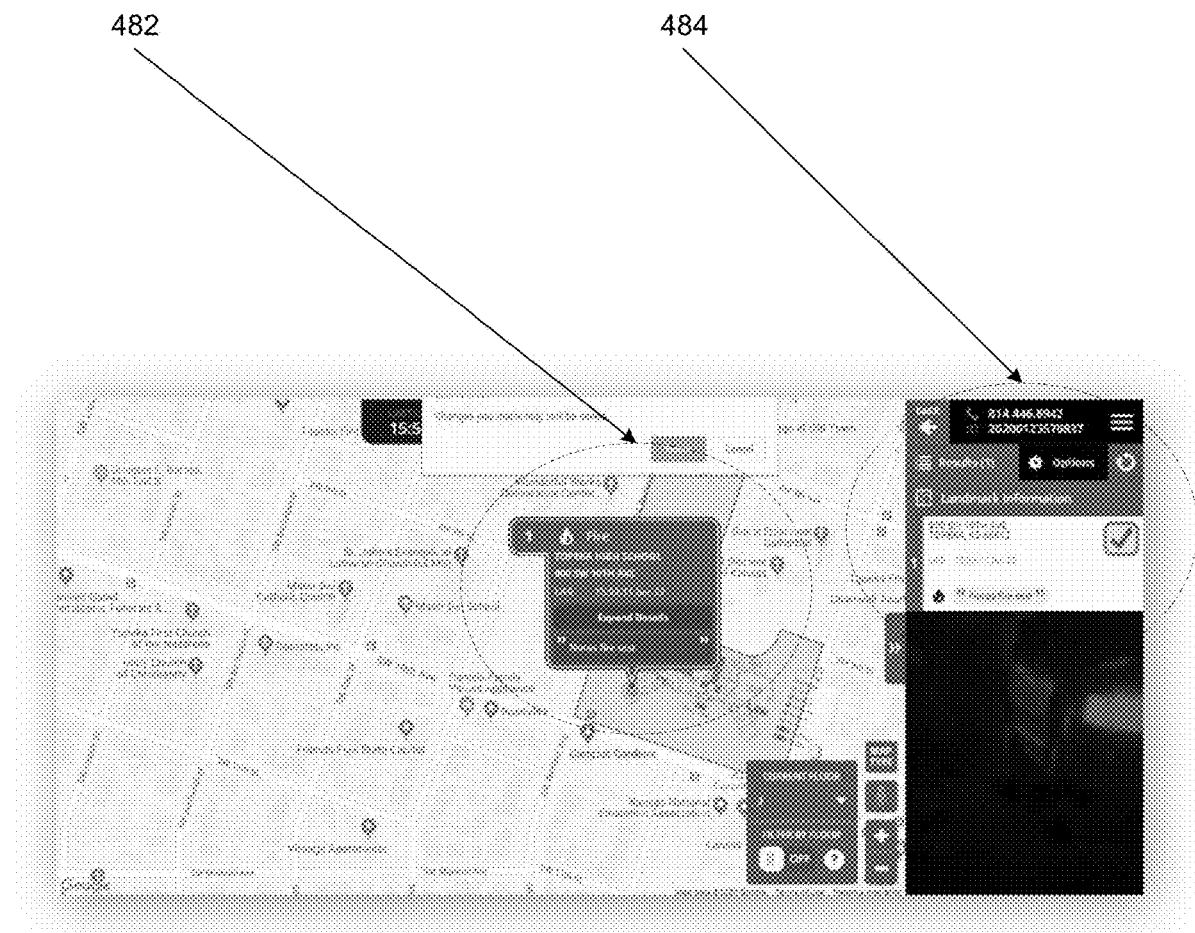
FIG. 4M illustrates an additional example graphical user interface of an emergency response application according to example embodiments.

FIG. 4M illustrates an additional example graphical user interface of an emergency response application according to example embodiments. Referring to FIG. 4M, in this example the user interface 480 may include a set of information details of an emergency site, the purpose or details of why the emergency was reported, and additional information may also be provided 484 depending on the needs or preferences of the emergency response service provider.

Figure 5:
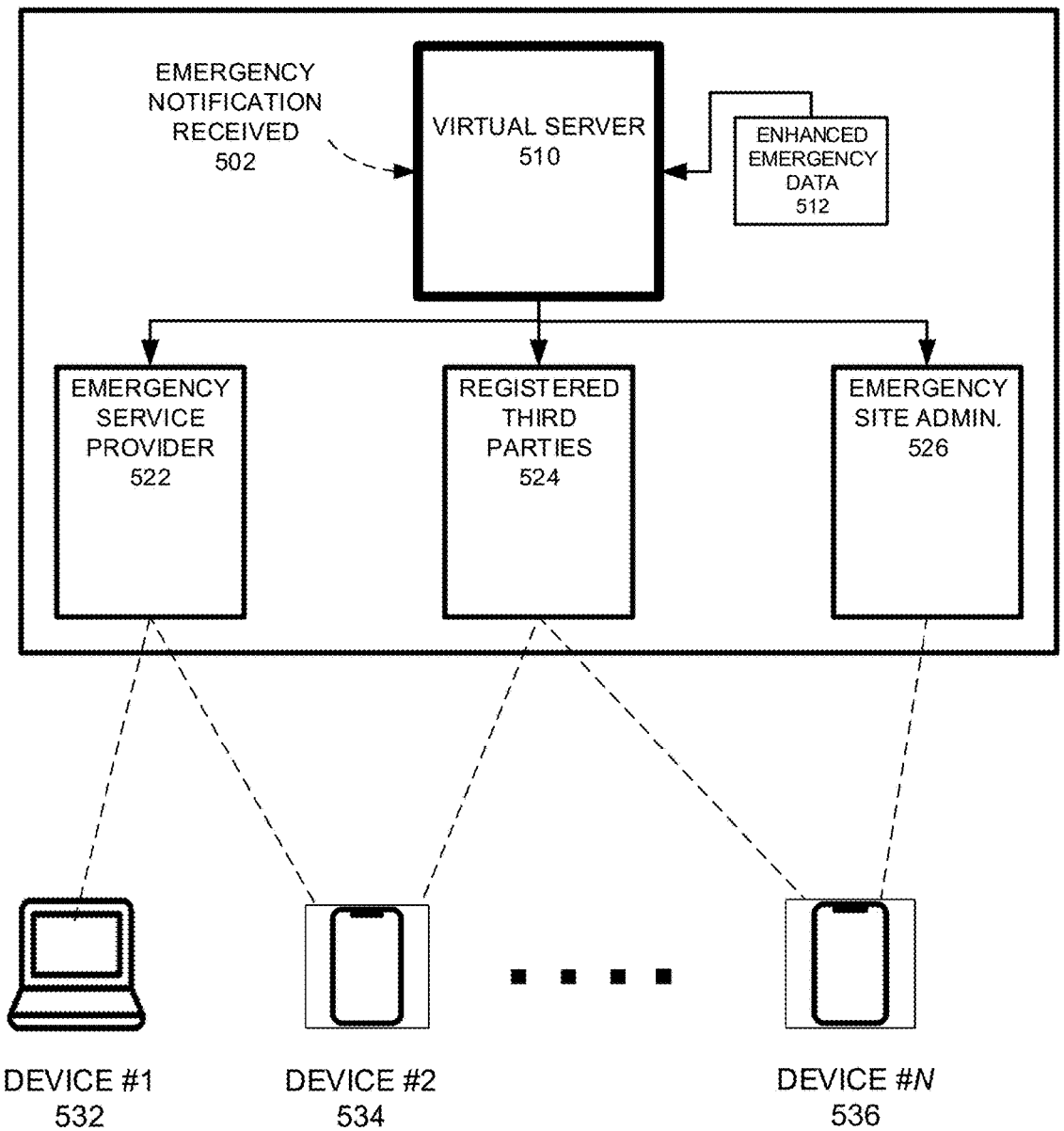
FIG. 5 illustrates an example communication network for an emergency response system according to example embodiments.

FIG. 5 illustrates an example communication network for an emergency response system according to example embodiments. Referring to FIG. 5, the control system 500 includes a virtual server 510 which operates in the cloud to process requests and data retrieval operations for enhanced emergency data 512. When an emergency notification is received 502, the virtual server 510 may delegate all data forwarding and alert notifications to the interested parties, such as the emergency service providers 522 (e.g., police, fire, rescue, medical services), the third parties 524 (e.g., parents, friends, neighbors, etc.) and the emergency administrators at the emergency site 526 (e.g., teachers, staff, etc.). The messaging and notification system may forward data directly to the devices 532-536, which are operating an emergency application and corresponding API.

Figure 6A:
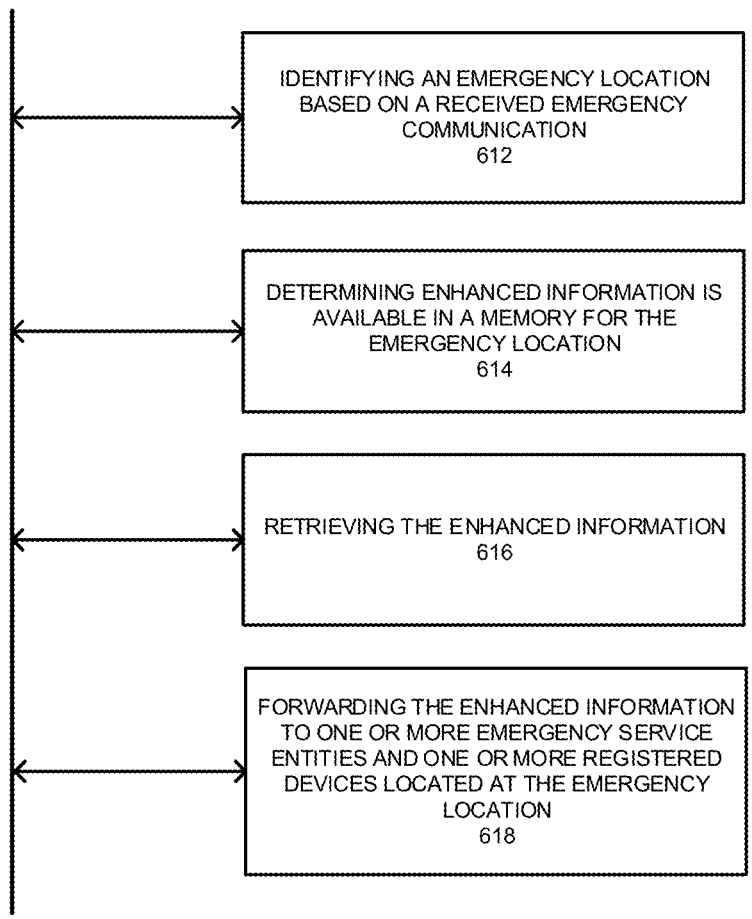
FIG. 6A illustrates an example process for managing an emergency response with enhanced emergency data according to an example embodiment.

FIG. 6A illustrates an example process for managing an emergency response with enhanced emergency data according to an example embodiment. The process 600 may include identifying an emergency location based on a received emergency communication 612. The location data may be based on triangulation of the device via cellular power signal measurements and standard triangulation methods, GPS signals and/or network address information. If the device is inside a school and connected to its network then the network address or school network use may provide assistance with locating the location. The process may also include determining enhanced information is available in a memory for the emergency location 614. The memory may be storage in the cloud or on a server. The enhanced information may include a layout of the location, details of the doors and passageways, sensor data collected periodically and stored for reference purposes, and live intercom and/or video feeds of the facility. The process may also include retrieving the enhanced information 616, and forwarding the enhanced information to one or more emergency service entities and one or more registered devices located at the emergency location 618. The emergency service entities, such as the police, or the fire department, etc., may all require immediate access to the enhanced information. The entities at the emergency location may require more specific information pertaining to the event, such as instructions to lock doors, identify certain students, keep the device operating to listen for audio, provide video, confirm questions as they are answered to affirm whether a perpetrator is present or certain safety measures have been performed.

The enhanced information may include a floor plan, a density map of mobile devices at the emergency location and sensor data received from the emergency location. The sensor data may include one or more of an unknown device, an unknown facial recognition instance, an unknown voice recognition instance, an identified emergency sound, an identified emergency temperature, and an identified emergency air quality disturbance. Also, ongoing video feeds may be accessed or the recordings may be retrieved to identify whether the event has progressed or been eliminated. The process may also include identifying the emergency location by identifying a sub-sectional area of the emergency location as an emergency point of interest based on the enhanced information. The specific area of the emergency event may be isolated and become the focus of the enhanced data to provide to emergency services. Also, the sensors and cameras may be activated and monitored and provided as a feed to the interested parties during the identification of the sub-sectional area.

The process may also include forwarding a notification to one or more of the emergency service entities and the one or more registered devices located at the emergency location, and the notification instructions may include specific instructions for managing the sub-sectional area depending on a type of emergency detected from the enhanced information. The notification may be based on data extracted from the sub-sectional area. For example, when the emergency notification is first received and sensor data and other enhanced data is retrieved, the sub-sectional area may become the area of interest. As a result, the personnel located at that area, as identified from the sensor data, will receive specific instructions from floor plans or other enhanced data specific to that area. Examples may include doors to lock, places to avoid and other activities which are selected and included in the notification to send to those devices located in the emergency event area both in and around the sub-sectional area.

Other examples may include initiating an emergency response time window, such as time period during which certain events are expected to occur. The process may also include periodically receiving updated information from one or more of the one or more registered devices and one or more sensor devices located at the emergency location, and the updated information includes one or more of textual information and sensor data. The emergency communication may be a 911 telephone call or an emergency message sent from an application of a registered device.

Figure 6B:
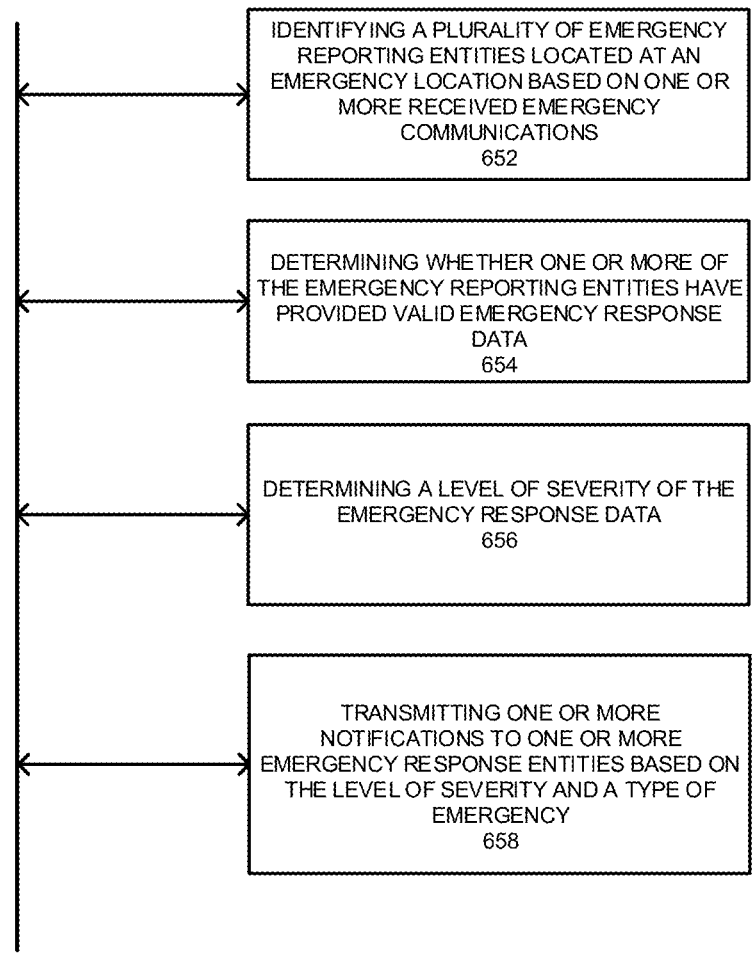
FIG. 6B illustrates an example process for confirming and identifying an emergency response according to an example embodiment.

FIG. 6B illustrates an example process for confirming and identifying an emergency response according to an example embodiment. Referring to FIG. 6B, the process 650 includes identifying a plurality of emergency reporting entities located at an emergency location based on one or more received emergency communications 652. The entities may be sensors which identify emergency thresholds (e.g., noise, sound, air disturbances, facial recognition patterns, crowd forming patterns, etc.) and automatically report the events to a server and/or individual devices, such as smartphones and computers which detect or receive emergency input from a user or via in combination with the sensor data and forward their own responses automatically based on detection and communication with the local sensors.

The process may also include determining whether one or more of the emergency reporting entities have provided valid emergency response data 654. The approach to verifying the emergency response data may include determining times, locations and validity of the entities providing the data. The process may also include determining a level of severity of the emergency response data 656, such as by a measurement of parameters, a threshold of values and a weighted function can be used to determine whether a report emergency is valid or not. If the reporting included multiple sources and multiple data inputs, then those can be weighted depending on the location of the devices, the accuracy of the device data and the total may be required to exceed a threshold limit prior to establishing an emergency and dispatching emergency services. The process may also include transmitting one or more notifications to one or more emergency response entities based on the level of severity and a type of emergency 658. The weights to include in the function may be summed. The weights applied may be on a scale (i.e., 1-5), the weights are increased as the location is closer to the reporting entity. Other criteria for increasing weights may be the credibility of the source. A fixed sensor may have high credibility (5 out of 5 weight applied), however, since the sensor may have been manipulated by someone holding a lighter to the sensor, multiple sensors may be required (i.e., aggregate weight of 10) in order for the weighted function to be satisfied and emergency services to be notified.

The process may also include determining whether the emergency reporting entities are different and at least one emergency reporting entity is an automated sensor and at least one additional emergency reporting entity is a mobile device, and responsive to determining the emergency reporting entities are different, determining the emergency communications have provided valid emergency response data. In this example, if a fire is reported, the reporting entity may be a mobile device. If the device is not near the location being reported, then the weight of the notification may be decreased. Prior to a fire truck or police entity being dispatched, the sensors in the location may provide a report and any temperature deviations and/or air disturbance deviations may be identified as a cross-referenced parameter to include in the weighted function parameter used to identify a potential emergency. Also, the requirement may require more than one sensor to report the abnormal data to confirm one sensor is not submitting inaccurate data.

The process may also include determining additional data is required to identify the type of emergency. The emergency may be reported and the server may not be able to ascertain the purpose of the emergency. In this example, if a report is received as being vague, the server may attempt to identify a movement of mobile devices within the area. For example, if a threshold number of mobile devices has moved from one location to another in a threshold amount of time, then there could be credible threat of danger, a fight, or a fire or other condition that would cause pandemonium among the students and teachers in the school. The mobile device heat map can be examined for threshold crossing instances of mobile device movement. Also, if a threshold has been reached, such as 25 or more devices, for example, moving a particular distance over a particular amount of time, then one or more of those devices may automatically be examined for a live audio/video feed for the dispatch center to examiner additional data. The additional data my be examined automatically based on noise and video analysis that may indicate a particular event is occurring.

The process may also include forwarding a request for additional data to one or more additional emergency reporting entities different from the plurality of emergency reporting entities, and determining the type of emergency via response data received from the one or more additional emergency reporting entities. The request may be a backend automated request that is received at the participating devices and which causes them to being recording and/or forwarding sensor and other live data until a conclusion can be reached regarding the level of severity, the type of emergency or any other criteria necessary to cause an action by the managing emergency application.

The process may also include initiating an emergency response time window based on the type of emergency and the level of severity, transmitting notifications to the one or more emergency response entities based on the type of emergency and the level of severity, and determining whether additional non-emergency response entities should be notified of the emergency. The process may also include determining the one or more emergency response entities are likely to fail a response scenario within the response time window, and responsive to the likely failure of the response scenario, determining the additional non-emergency response entities should be notified of the emergency. In this example, the determination or diagnosis of the emergency event is identified and result is an estimated time window for action and a corresponding dispatch operation. When the severity of the event is identified as being elevated from sensor data, heat map data, number of notifications received, and other measurement criteria, the emergency services dispatched may be increased from one or two vehicles to more vehicles or entities.

The process may also include periodically receiving updated information from one or more of the non-emergency response entities, such as the devices or sensors and determining whether the response scenario is satisfied based on the updated information, and the updated information comprise one or more of location data, sensor data, textual information, video information, audio information and image information. Also, the determining whether one or more of the emergency reporting entities have provided valid emergency response data comprises determining whether sensor data received has exceeded a safety sensor threshold. For example, has the sensor data dropped below a threshold target indicating that no one is acting in fear or the temperatures and other sensed data are not elevated and are safe.

Figure 6C:
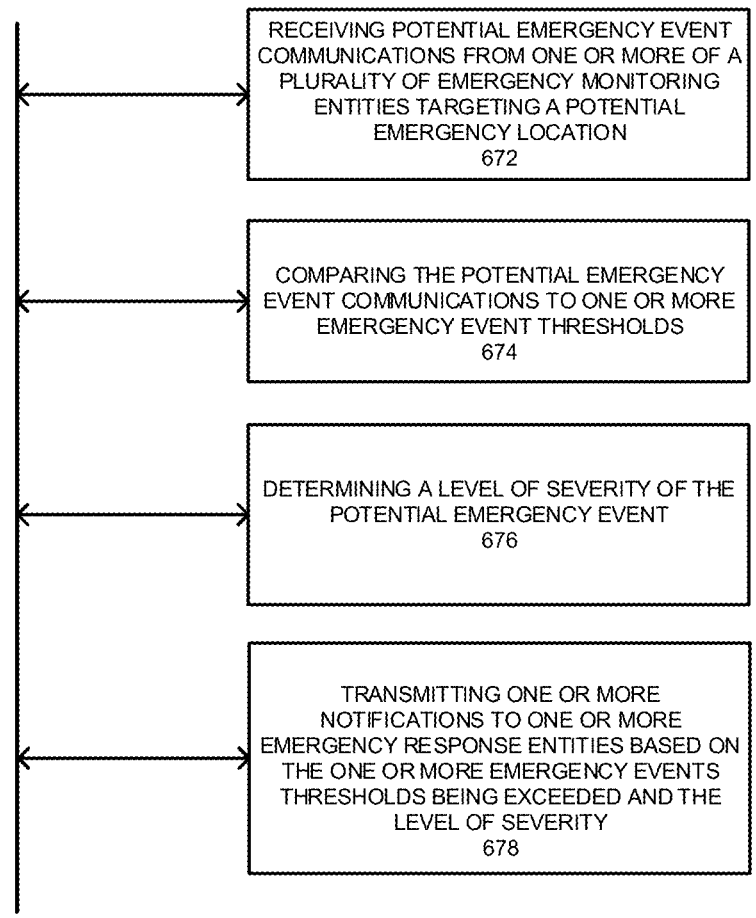
FIG. 6C illustrates an example process for evaluating an emergency response with on-site data according to an example embodiment.

FIG. 6C illustrates an example process for evaluating an emergency response with on-site data according to an example embodiment. Referring to FIG. 6C, the process 670 may include receiving potential emergency event communications from one or more of a plurality of emergency monitoring entities targeting a potential emergency location 672, comparing the potential emergency event communications to one or more emergency event thresholds 674, determining a level of severity of the potential emergency event, and transmitting one or more notifications to one or more emergency response entities based on the one or more emergency events thresholds being exceeded and the level of severity 678.

The process may also include determining a majority of the potential emergency event communications are within a particular distance of the potential emergency location. The communications being conducted at the location are one higher weighted criteria used to confirm the validity of the emergency reported. The process may also include receiving a data report of social media posts from one or more social media platforms, and determining a magnitude of the potential emergency has exceeded the emergency event threshold based on the data report. The social media monitoring may be performed to one or more identified user accounts of one or more social media platforms, certain social media groups associated with the location or those which attend that location and/or other related groups which name or identify that location as a point of interest. When a certain number of messages having a certain amount or type of content are identified, the threshold may be considered reached or exceeded and the emergency may be confirmed. Content of the messages may be parsed and added to a list of suspect persons/profiles and/or terms and phrases. The summary of the social media monitoring may be shared with users to confirm the threats or an automated system may identify the threats and dispatch emergency services to locations where the threats have originated. When a threat can be thwarted in a certain period of time, the location of interest can be spared the emergency response. For example, if the profile on social media making the threat is identified and the police act quickly in locating the person and their home address, the matter can be resolved prior to the event being an emergency at the threatened location. The data report may include a number of instances of a location, a number of instances of a type of emergency and a number of instances of a particular day or time, and the combined number of instances may have exceeded the emergency event threshold which causes the emergency to be activated and actions to be conducted.

The process may also include determining the plurality of emergency monitoring entities have exceeded a density threshold at a particular location radius, and determining a level of severity is elevated based on the exceeded density threshold. This may be identified by a sensor viewing a number of people at a particular location, a tracking of the mobile devices of those at the location of interest or other data criteria. The process may also include receiving sensor data at a particular sub-location of the location, and determining the level of severity of the potential emergency event is elevated at the sub-location. The sensor data at the specific portion of the location can be monitored with a larger frequency or number of sensors than the remaining areas since the area of interest is already identified. The process may also include transmitting one or more first notification instructions to a first portion of the one or more emergency response entities and transmitting one or more second notification instructions to a second portion of the one or more emergency response entities, wherein the first notification instructions are different from the second notification instructions.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example network element 700, which may represent any of the above-described network components of the other figures.

Figure 7:
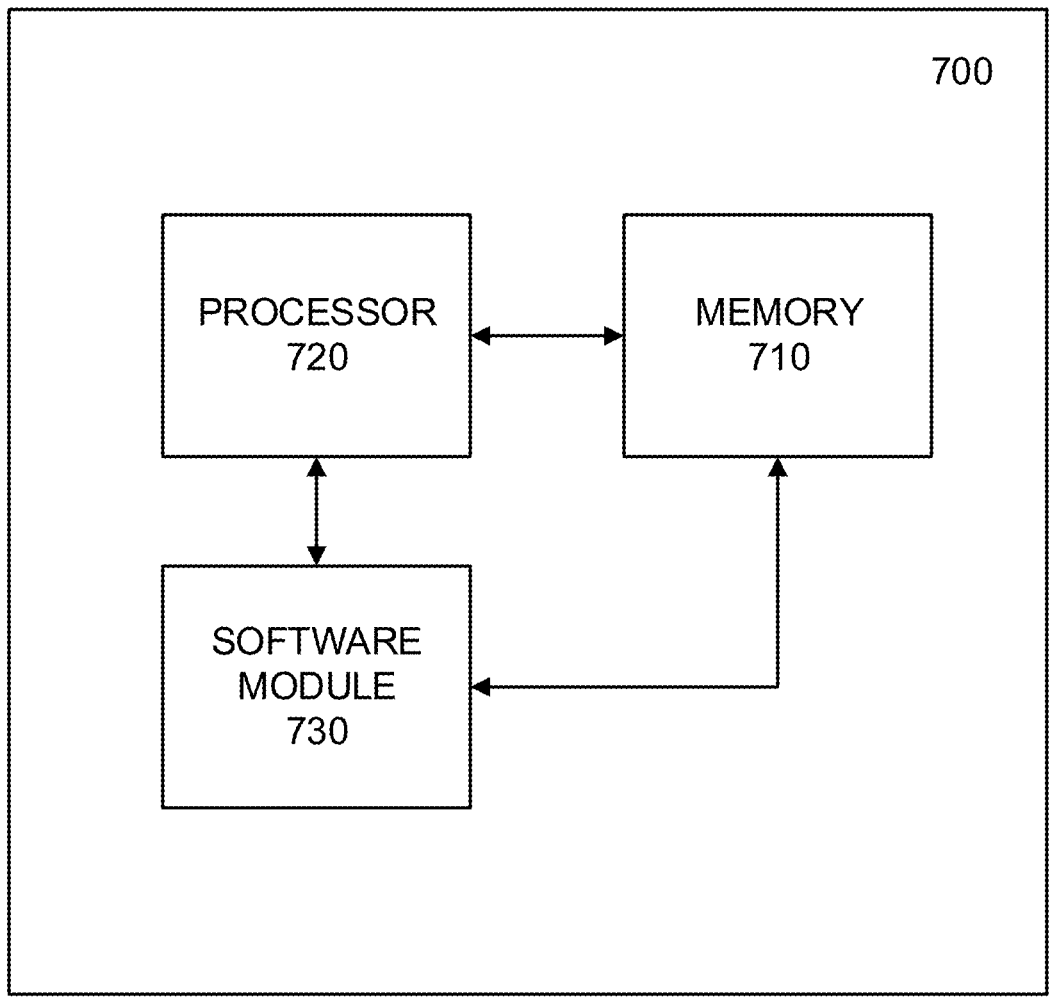
FIG. 7 illustrates an example network entity device configured to store instructions, software, and corresponding hardware for executing the same, according to example embodiments of the present application.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
receiving emergency response data from a plurality of emergency reporting entities at a location of an emergency;
determining whether the emergency response data provided by one or more of the emergency reporting entities is valid by determining whether at least one emergency reporting entity of the emergency reporting entities is a fixed sensor and whether at least one additional emergency reporting entity of the emergency reporting entities is a mobile device;
determining a level of severity of the emergency response data;
transmitting one or more notifications to one or more emergency response entities based on the level of severity and a type of emergency;
initiating an emergency response time window based on the type of emergency and the level of severity; and
performing a dispatch operation corresponding to the emergency response time window by notifying one or more non-emergency response entities of the emergency.

2. The method of claim 1, further comprising:
forwarding a request for additional data to one or more additional emergency reporting entities different from the plurality of emergency reporting entities; and
determining the type of emergency via response data received from the one or more additional emergency reporting entities.

3. The method of claim 1, wherein whether the emergency response data is valid is determined by determining whether received sensor data has exceeded a safety sensor threshold.

4. The method of claim 1, further comprising:
determining a location of the at least one additional emergency reporting entity; and
weighting the emergency response data received from the at least one additional emergency reporting entity, at least in part based on the location of the at least one additional emergency reporting entity.

5. The method of claim 1, further comprising:
determining whether a number of mobile devices that moved from or to the location of the emergency in a predetermined amount of time exceeds a predetermined threshold.

6. The method of claim 1, further comprising:
weighting the emergency response data, at least in part based on a location of the emergency reporting entities, wherein the transmitting is performed, at least in part based on the weighting.

7. The method of claim 6, wherein the transmitting to the one or more emergency response entities is performed based on the weighting and a threshold.

8. An apparatus, comprising:
a storage medium that stores a program; and
a processor configured to execute the program to
receive emergency response data from a plurality of emergency reporting entities at a location of an emergency;
determine whether the emergency response data provided by one or more of the emergency reporting entities is valid by determining whether at least one emergency reporting entity of the emergency reporting entities is a fixed sensor, and whether at least one additional emergency reporting entity of the emergency reporting entities is a mobile device;
determine a level of severity of the emergency response data;
transmit one or more notifications to one or more emergency response entities based on the level of severity and a type of emergency;
initiate an emergency response time window based on the type of emergency and the level of severity; and perform a dispatch operation corresponding to the emergency response time window by notifying one or more non-emergency response entities of the emergency.

9. The apparatus of claim 8, wherein the processor is further configured to
forward a request for additional data to one or more additional emergency reporting entities different from the plurality of emergency reporting entities; and
determine the type of emergency via response data received from the one or more additional emergency reporting entities.

10. The apparatus of claim 8, wherein whether the emergency response data is valid is determined by determining whether received sensor data has exceeded a safety sensor threshold.

11. The apparatus of claim 8, wherein the processor is further configured to
determine a location of the at least one additional emergency reporting entity; and
weight the emergency response data received from the at least one additional emergency reporting entity, at least in part based on the location of the at least one additional emergency reporting entity.

12. The apparatus of claim 8, wherein the processor is further configured to determine whether a number of mobile devices that moved from or to the location of the emergency in a predetermined amount of time exceeds a predetermined threshold.

13. The apparatus of claim 8, wherein the processor is further configured to perform a weighting of the emergency response data, at least in part based on a location of the emergency reporting entities, and the transmitting is performed, at least in part based on the weighting.

14. The apparatus of claim 13, wherein the transmitting to the one or more emergency response entities is performed based on the weighting and a threshold.

15. A non-transitory, computer-readable storage medium configured to store instructions that, when executed, cause a processor to perform operations comprising:
receiving emergency response data from a plurality of emergency reporting entities at a location of an emergency;
determining whether the emergency response data provided by one or more of the emergency reporting entities is valid by determining whether at least one emergency reporting entity of the emergency reporting entities is a fixed sensor and whether at least one additional emergency reporting entity of the emergency reporting entities is a mobile device;
determining a level of severity of the emergency response data;
transmitting one or more notifications to one or more emergency response entities based on the level of severity and a type of emergency;
initiating an emergency response time window based on the type of emergency and the level of severity; and
performing a dispatch operation corresponding to the emergency response time window by notifying one or more non-emergency response entities of the emergency.

16. The non-transitory, computer-readable storage medium of claim 15, wherein the operations further comprise forwarding a request for additional data to one or more additional emergency reporting entities different from the plurality of emergency reporting entities; and
determining the type of emergency via response data received from the one or more additional emergency reporting entities.

17. The non-transitory, computer-readable storage medium of claim 15, wherein the operations further comprise:
determining a location of the at least one additional emergency reporting entity; and
weighting the emergency response data received from the at least one additional emergency reporting entity, at least in part based on the location of the at least one additional emergency reporting entity.

18. The non-transitory, computer-readable storage medium of claim 15, wherein the operations further comprise:
determining whether a number of mobile devices that moved from or to the location of the emergency in a predetermined amount of time exceeds a predetermined threshold.

19. The non-transitory, computer-readable storage medium of claim 15, wherein the operations further comprise:
weighting the emergency response data, at least in part based on a location of the emergency reporting entities, and the transmitting is performed, at least in part based on the weighting.

20. The non-transitory, computer-readable storage medium of claim 19, wherein the transmitting to the one or more emergency response entities is performed based on the weighting and a threshold.

* * * * *